May 20, 1924.  
R. WEBER  
CONNECTING ROD BORING MACHINE  
Filed May 31, 1922
1,494,394
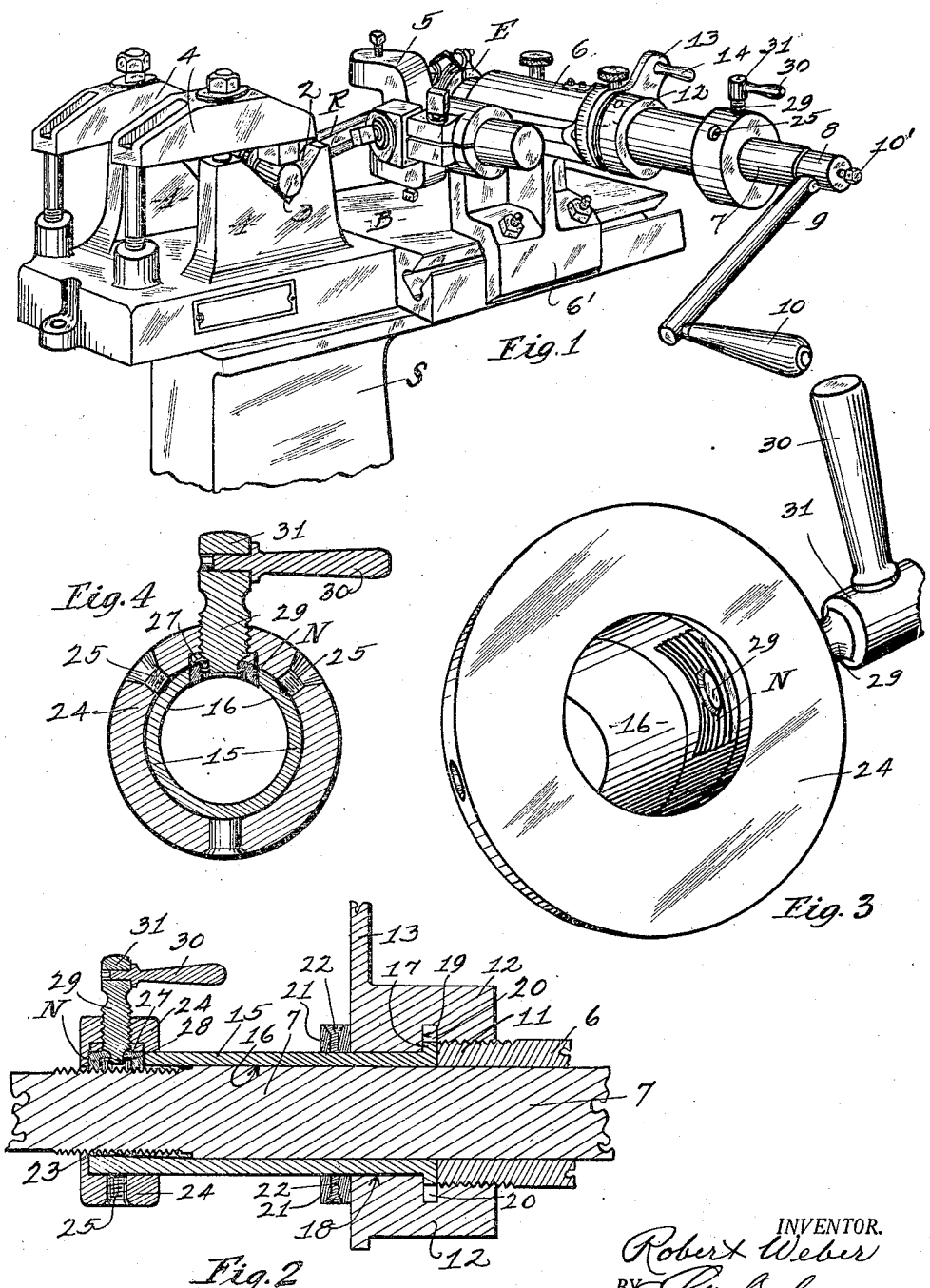

Patented May 20, 1924.

1,494,394

UNITED STATES PATENT OFFICE.

ROBERT WEBER, OF LOS ANGELES, CALIFORNIA.

CONNECTING-ROD-BORING MACHINE.

Application filed May 31, 1922. Serial No. 564,946.

*To all whom it may concern:*

Be it known that I, ROBERT WEBER, a citizen of the United States, and a resident of Los Angeles, in the county of Los Angeles and State of California, have invented new and useful Improvements in Connecting-Rod-Boring Machines, of which the following is a specification.

This invention relates to connecting rod boring machines of the character shown and described in my application for patent filed October 24, 1921, Serial Number 510,108, and has for its object the provision of an improved spindle actuating device by means of which the boring tool may be advanced and retracted relative to the work more readily than in my said former application.

Another object is to provide in a connecting rod boring machine in combination with a support for the work and a longitudinally alined support for the tool, of a spindle adapted to hold the tool in operating position and adjustable in longitudinal alinement with the axis of the work, the advance of the tool relative to the work being effected by screw operated means, and means associated with said screw operated means whereby said spindle may be retracted without rotating the same for facilitating the boring operation.

Still another object is to provide in a machine of the character mentioned a rotatable boring spindle longitudinally movable in a suitable support, a sleeve around said spindle having a threaded segment for engagement with a threaded portion of said spindle, and adjustable into and out of operative position therewith for gradually advancing the tool in the direction of the work and instantaneously retracting the same from operative position relative to the work.

A further object is to provide a spindle for holding the tool, and a sleeve around said spindle arranged to be locked thereto so as to maintain the spindle at a suitable adjustment for a facing operation, and screw connected with said spindle whereby the spindle may be finished relative to the sleeve in a boring operation, and arranged so that the spindle may be readily disconnected from the sleeve for retracting the spindle from the work.

Other objects will appear as the description progresses.

In the accompanying drawings I have shown one practical embodiment of my invention, in which:

Fig. 1 is a perspective view of a connecting rod boring machine embodying my improvements.

Fig. 2 is a longitudinal section of the boring spindle showing my improvements in operative position thereon.

Fig. 3 is a perspective view of an improved form of sleeve for controlling the operation of said spindle; and Fig. 4 is a sectional elevation of the same, showing means therein for engagement with and for regulating the advance of the spindle.

As shown and described in my pending application hereinbefore mentioned, my boring machine comprises a suitable base B mounted on a standard S, and having blocks 1, 1, formed thereon with grooves 2 in the upper sides thereof to receive mandrels or pins 3 at the piston end of the connecting rod R. Said grooves are transversely alined and the pin 3 of the rod is held in said groove by means of clamps 4, 4. The connecting rod R is held firmly in a bracket 5 so that the crank end E of the rod is transversely alined with the bearing 6 carried on a bracket 6' suitably attached to the base B.

The central portion of bearing 6 carries an elongated spindle 7 and the inner end of said spindle projects outwardly from said bearing and is adapted to hold a tool for boring the end E of the connecting rod. The outer end 8 of said spindle is reduced in size and is bored to receive a crank rod 9 having a handle 10 thereon, the rod 9 being held in position on the spindle by means of a set screw 10' or otherwise, and thus the spindle 7 may be rotated relative to its stationary bearing 6. The outer portion 11 of bearing 6 is externally threaded to receive the correspondingly internally threaded end of a clutch member 12 having an extension 13 thereon with a handle 14 whereby the said clutch member may be adjusted relative to the end of bearing 6.

Now, the particular features of my improvements constituting the present invention include an elongated sleeve 15 which is bored at 16 to receive the portion 7 of the spindle, and the inner end of said sleeve has an annular flange 17 which is slightly smaller in diameter than the threaded portion of the clutch 12 so as to be insertible in the groove therethrough, while the clutch is bored at 18 to receive the elongated portion of the sleeve 15, thus forming a shoulder 19 and an annular groove 20 in said clutch member.

The sleeve 15 carries a thrust collar 21 which is fixed to the sleeve by means of set screws 22, 22, and said collar is so placed on the sleeve as to hold the movement of the sleeve 16 against longitudinal movement relative to clutch 12, for the purpose hereinafter described.

The spindle 7 has an externally threaded portion 23 which extends through the outer end of the sleeve 7, and said sleeve is adapted to be connected to said threaded portion at will, for the purpose of advancing the spindle longitudinally in the sleeve. This connection is effected through the medium of a collar 24 which is held on the sleeve by means of one or more set screws 25, and the outer portion 26 of said collar forms an abutment for the end of sleeve 7.

A segment nut N is slidably mounted in a corresponding recess 27 in collar 24 and is carried on the inner end 28 of a screw 29, which is threaded into the collar and projects outwardly therefrom, while a handle 30 is suitably attached to the extended portion 31 of said screw, whereby the screw may be rotated for adjusting the nut N inwardly and outwardly with respect to the threaded portion 23 of the spindle.
The nut N, of course, is threaded to correspond to the threaded portion 23, and when moved outwardly the threads thereof will be disengaged from the threads on the spindle, so that the spindle may be moved longitudinally in the bearing 6 and sleeve 7, when it is desired to retract the spindle relative to the work. However, when the work is properly positioned in the machine, the spindle 7 may be gradually advanced by the turning of crank 9 when the nut N is moved inwardly into engagement with the threaded portion 23 of the spindle, so that the boring tool will properly engage and progress relative to the work.
The arrangement of the nut N relative to the spindle 7 is such that by turning the handle 30 to a certain extent the threads on the nut will be caused to loosely engage the threaded portion 23 of the spindle, so that the spindle may be screwed through the sleeve longitudinally without rotating the sleeve, for a boring operation. The handle may be turned to a greater extent so as to cause the nut N to tightly engage the threaded portion 23 of the spindle, and thus lock the sleeve and spindle together so that when the crank 9 of the spindle is rotated the spindle and sleeve will rotate together for a facing operation. Thus, it will be seen that additional locking levers or devices are not required as in my former invention for setting the spindle for different operations, and the device is much simplified and improved thereby.

Now, in operation the movement of the spindle in a boring operation is inwardly through the bearing 6, and this movement is effected by turning the crank 9 when the set collar 21 is substantially spaced from the end of the sleeve 15 and in contact with clutch 12. In order to advance the spindle through the bearing 6, it is necessary to loosely connect nut N with the spindle 7 and to tighten the clutch 12 with respect to the sleeve 15 against longitudinal movement, so that the flange 17 on said sleeve will abut the outer end of bearing 6. The screw 31 in collar 24 is rotated by means of handle 30 so as to move the nut N on the inner end of said screw inwardly for engaging the threaded portion thereof, with the threaded portion 23 of the spindle 7, and the spindle 7 may then be advanced with the tool for boring the end E of the connecting rod.

After the tool has progressed through the work, the screw 31 is turned by means of handle 30 for disengaging nut N from spindle portion 23, whereupon the spindle may be withdrawn longitudinally without turning, by grasping the handle 9 for another operation.

This device removes the necessity for retracting the spindle by screwing the same through the threaded nut N, which operation consumes quite a lot of time, and the boring operation is thus greatly facilitated. When the ends of the work or bearing are to be faced by the tool carried on the spindle 7, the lever 30 is turned so that nut N may be locked on spindle 7, so that the spindle 7 may be rotated but the same will be held against longitudinal movement in order that the ends of the bearing will be at right angles to the axis thereof.

The set collar 21 is closely positioned relative to the clutch 12 so as to limit the movement of the sleeve 15 with respect to the bearing 6 and to confine the clutch between the collar 21 and flange 17 of the sleeve, thus the adjustment of the several elements in my invention may be quickly effected for any desired dimensions, or any desired bore or length of bearings which are to be finished in the machine, and altogether a highly satisfactory device is provided for the purpose stated. In use, the sleeve 15 is locked against bearing 6 by turning clutch 12 and may be moved in opposite directions as required in a finishing operation, particularly in turning the fillets at the ends of the work.

When the clutch is set the nut N is adjusted into contact with the spindle, and the latter may then be extended and retracted by means of handle 10.

In a boring operation when it is necessary to advance and retract the spindle 7 through the bearing 6, the nut N is only loosely connected with the threaded stem 24 of the spindle, so that when the spindle is turned it will thread itself by the nut N without turning the member 24 or sleeve 15. In a facing operation, however, the nut N is tightly locked to the threaded stem 24 so that the spindle may be rotated in the bearing 6 as in a facing operation, and will not in such case be moved longitudinally. In this latter event the sleeve 15, member 24 and spindle 7 all rotate together. Thus, the device may be moved for either a facing or boring operation, depending entirely upon the connection of the nut N with the spindle 7.

If it is desired that the sleeve 15 should not revolve as when the spindle 7 is being moved longitudinally, then the flange portion of sleeve 15 may be locked to the end of the bearing 6 by means of the clutch 12, but when it is necessary or desirable, as in a facing operation, for sleeve 15 to be rotated with the member 7, then the sleeve 15 should be loosely held relative to member 6.

What I claim is:

1. In a connecting rod boring machine a stationary bearing, a spindle longitudinally and rotatably held therein, a sleeve on said spindle adjustable relative to the end of said bearing, a clutch member adjustable on the end of said bearing for effecting and maintaining the adjustment of said sleeve, and a threaded member on said sleeve adjustable relative to a correspondingly threaded portion of said spindle, whereby said spindle may be screw operated through said sleeve, or moved longitudinally therethrough at will.

2. In a connecting rod boring machine a stationary bearing, a spindle longitudinally and rotatably held therein, a sleeve on said spindle adjustable relative to the end of said bearing, a clutch member adjustable on the end of said bearing for effecting and maintaining the adjustment of said sleeve, a threaded member on said sleeve adjustable relative to a correspondingly threaded portion of said spindle, whereby said spindle may be screw operated through said sleeve, or moved longitudinally therethrough at will, and means connected with said threaded member whereby the same may be locked to said spindle for rotating said sleeve and said spindle together.

3. In a connecting rod boring machine a stationary bearing, a spindle longitudinally and rotatably held therein, a sleeve on said spindle adjustable relative to the end of said bearing, a clutch member adjustable on the end of said bearing for effecting and maintaining the adjustment of said sleeve, a threaded member on said sleeve adjustable relative to a correspondingly threaded portion of said spindle, whereby said spindle may be screw operated through said sleeve, or moved longitudinally therethrough at will, means connected with said threaded member whereby the same may be locked to said spindle for rotating said sleeve and spindle together, and means adjustable on said sleeve relative to said clutch, for the purpose described.

4. In a machine of the character described, a spindle having a reduced threaded portion thereon, a sleeve bored to receive said spindle, a collar fixed to said sleeve, a nut carried by said collar and threaded to correspond to the threaded portion of said spindle, and means for operating said nut whereby the same may be set for screw connection with said spindle or locked thereto for rotation therewith, at will.

5. In a machine of the character described, a spindle having a reduced threaded portion thereon, a sleeve bored to receive said spindle, a collar fixed to said sleeve, a nut carried by said collar and threaded to correspond to the threaded protion of said spindle, means for operating said nut whereby the same may be set for screw connection with said spindle or locked thereto for rotation therewith at will, a stationary support for said spindle having a threaded portion at one end, and a member connecting said sleeve with said support and threaded at one side onto said support, and bored at the opposite side to receive said sleeve.

6. In a machine of the character described, a spindle having a reduced threaded portion thereon, a sleeve bored to receive said spindle, a collar fixed to said sleeve, a nut carried by said collar and threaded to correspond to the threaded portion of said spindle, means for operating said nut whereby the same may be set for screw connection with said spindle or locked thereto for rotation therewith at will, a stationary support for said spindle having a threaded portion at one end, and a clutch embracing said sleeve and said support and threaded at one side onto said support, and bored at the opposite side to receive said sleeve, and a thrust collar on said sleeve for retracting the said sleeve when said clutch is retracted.

7. In a machine of the character described a spindle having a reduced threaded portion thereon, a sleeve bored to receive said spindle, a collar fixed to said sleeve, a nut carried by said collar and threaded to correspond to the threaded portion of said spindle, means for operating said nut whereby the same may be set for screw connection with said spindle or locked thereto for rotation therewith at will, a stationary support for said spindle having a threaded portion at one end, and a member embracing said sleeve and said support and threaded at one side onto said support, and bored at the opposite side to receive said sleeve, and a thrust collar on said sleeve engaging said clutch, said clutch having an annular internal groove intermediate the sides thereof, and said sleeve having a flange adapted to seat in the said groove, as described.

ROBERT WEBER.

Witnesses:
  VINCENT B. O'CONNOR,
  IRENE BREEN.